2,749,282

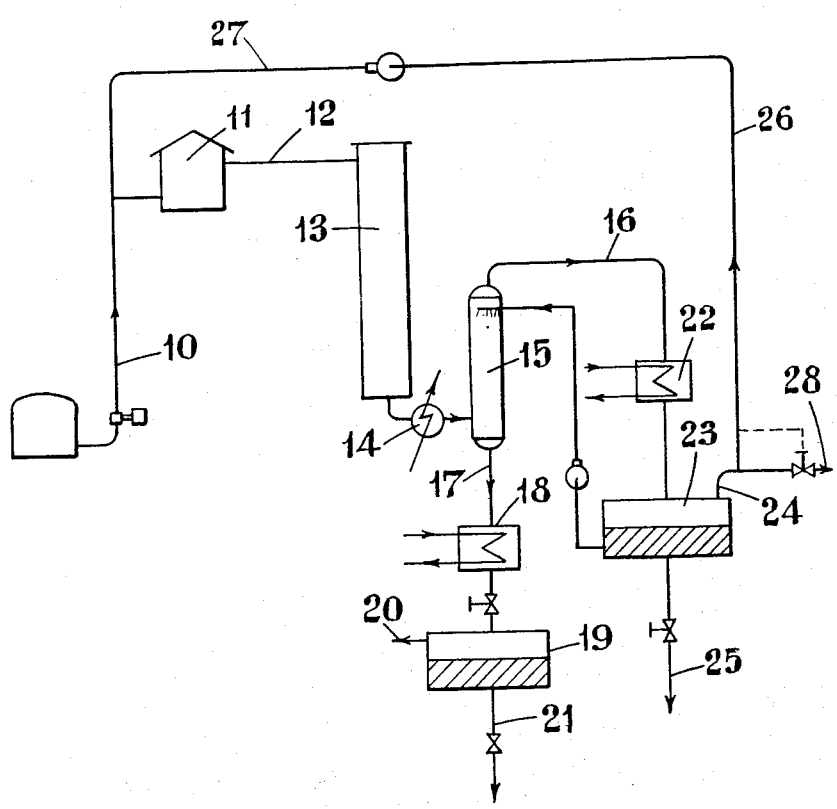

CATALYTIC DESULPHURISATION OF PETROLEUM HYDROCARBONS

Frederick William Bertram Porter and Alexander Hodge Richardson, Sunbury-on-Thames, England, assignors to The British Petroleum Company Limited, a British joint-stock corporation Application January 16, 1952, Serial No. 266,616

Claims priority, application Great Britain January 24, 1951

5 Claims. (Cl. 196—28)

This invention relates to the hydrocatalytic desulphurisation of petroleum hydrocarbons.

Among the processes which are known for the removal of organically combined sulphur from petroleum hydrocarbons is the so-called hydrofining process in which the petroleum hydrocarbons to be sulphurised are passed in admixture with hydrogen over a sulphur-resistant hydrogenation catalyst at elevated temperature and pressure whereby the organically combined sulphur is converted into hydrogen sulphide which may readily be removed from the treated hydrocarbons the properties of which are not otherwise appreciably affected. This process is technically effective for the removal of organically combined sulphur from petroleum hydrocarbons but is not commercially attractive in view of the cost of supplying the considerable quantity of hydrogen consumed in the process. It was also known that the hydroforming process produced hydrogen and at the same time effected a considerable degree of desulphurisation, but by its very nature this process is not applicable in cases where it is desired to desulphurise feedstocks, such as gas oils and aromatic extracts, without appreciably affecting the properties of the feedstock other than changes consequent upon the removal of the organically combined sulphur as hydrogen sulphide. Desulphurisation processes are also known in which a substance capable of supplying hydrogen under the conditions of the desulphurisation reaction is added to the feedstock to be desulphurised, but this is only a special case of hydrofining and suffers from the disadvantage of the cost of supplying the hydrogen donor and from the additional disadvantage that the through-put of the feedstock is reduced by the addition of the considerable quantity of hydrogen donor necessary to supply sufficient hydrogen.

It was then discovered that by careful control of the temperature and pressure and by using a sufficiently active dehydrogenation-hydrogenation catalyst, it was possible to derive sufficient hydrogen by dehydrogenation of naphthenes contained in the feedstock to enable sufficient of the organically combined sulphur in the feedstock to be converted into hydrogen sulphide, under the same temperature and pressure conditions, to constitute an effective desulphurisation process. This process has been called "autofining" and it has the considerable advantage as compared with hydrofining that all the hydrogen required for desulphurisation is derived from the feedstock itself. It was surprising to find that conditions existed under which the two reactions of dehydrogenation of naphthenes and hydrogenation of organic sulphur compounds could proceed simultaneously to the extent necessary to provide a satisfactory catalytic desulphurisation process. The process was found to be applicable to a wide variety of feedstocks ranging from naphthas to wax distillates under the following set of conditions:

| | |
|---|---|
| Pressure | 50–200 p. s. i. ga. |
| Temperature | 740–800° F. |
| Space velocity | 1.0–5.0 v./v./hr. |
| Recycle rate | 2000–4000 C. F./B. |

The preferred catalyst for use in the autofining process is of the so-called cobalt molybdate type which comprises mixtures of the oxides of cobalt and molybdenum, or chemical compounds of cobalt, molybdenum and oxygen, or mixtures of one or both of said oxides with said compounds either alone or incorporated with a support. It has been found that there is a period at the commencement of each run during which the gas make is negligible or non-existent and the desulphurisation is not at its maximum. This low dehydrogenating activity of the catalyst is more noticeable at low feedstock velocities and with the heavier feedstocks. It was discovered that the non-activity of the catalyst during the early hours on stream could be largely overcome by subjecting the catalyst to the action of hydrogen sulphide or hydrogen sulphide-containing gas prior to its use in the autofining process.

The regeneration of the used catalyst may be carried out by burning off the carbon and sulphur deposits with either a nitrogen/air or steam/air mixture. The following conditions may be employed for regeneration.

| | |
|---|---|
| Inlet temperature | 800–850° F. |
| Steam or nitrogen flow | 700–900 v./v./hr. |
| Air flow | 50–60 v./v./hr. |
| Inlet oxygen | 1 to 1.5% mol. |

The inlet oxygen concentration is controlled to keep the catalyst bed temperature below 1100° F. Regeneration restores the activity of the catalyst completely and it has been found that a large number of regenerations has no effect on the activity or properties of the catalyst.

Cracked naphthas obtained by the thermal or catalytic cracking of higher boiling petroleum distillates, such as gas oils and wax distillates, have a high sulphur content and poor stability and the application of autofining conditions to such cracked naphthas does not yield an entirely satisfactory product. This difficulty has been overcome with respect to higher boiling naphthas (200–270° C. ASTM) by treating them in blend with kerosine and straight run naphthas. In the case of lighter naphthas (IBP–100° C. ASTM) autofining results in partial desulphurisation and some improvement in the stability but this is not sufficient to provide a satisfactory merchantable product.

The principal object of the present invention is to provide a process by means of which such cracked naphthas can be desulphurised sufficiently to provide a merchantable product.

According to the invention, a cracked naphtha boiling in the gasoline range is treated under autofining conditions in admixture with a petroleum fraction which contains naphthenic constituents capable of providing the necessary hydrogen for desulphurisation and which has a boiling range such that the naphtha may be removed by distillation from the treated mixture.

Kerosine or heavy naphtha boiling above 200° C. may advantageously be used as the agent for providing the necessary hydrogen. Particularly suitable are heavy naphthas which have been subjected to extraction processes for the removal of aromatics, for example by treatment with sulphur dioxide. The raffinate obtained from such an extraction process would have a relatively greater proportion of naphthenes and would therefore be more suitable for blending with the cracked naphtha because of their ability to provide more hydrogen per volume with a resulting increase in desulphurisation and hours on stream.

The naphtha may be removed from the treated mixture by simple distillation or by the provision of a knock-out tower in the system. In this case the treated mixture is cooled as it leaves the reactor and while still at plant pressure, and the cooled mixture passed to the base of a tower in which the lighter naphtha passes overhead as vapour and the heavier agent is removed as a liquid bottoms product. The effectiveness of the separation in the knock-out tower may be increased by providing a certain amount of reflux to the top of the tower, said reflux conveniently consisting of treated naphtha which has subsequently been liquified. The tower may be packed or provided with fractionating plates.

One method of carrying the invention into effect will be described with reference to the accompanying diagram.

A mixture of a catalytically cracked naphtha and a kerosine is fed via line 10 to a preheater 11 wherein the mixture is heated to autofining temperature. The heated mixture then passes via line 12 to a reactor 13 wherein it is treated in the presence of an autofining catalyst. From the reactor 13 the treated mixture passes through a waste heat boiler 14 to a knock-out tower 15, operating at substantially reactor pressure, from which the naphtha is removed overhead as vapour via line 16 and the kerosine as bottoms via line 17. The kerosine bottoms are cooled in cooler 18 and the cooled liquid kerosine passed to a low pressure separator 19 from which uncondensed gas is removed via line 20 and autofined kerosine via line 21. The naphtha taken overhead via line 16 is condensed in cooler 22 and the liquid naphtha passed to a high pressure separator 23, operating at substantially reactor pressure, from which the uncondensed gas is removed via line 24 and autofined naphtha with its content of dissolved hydrogen sulphide via line 25. The autofined naphtha may then be operated on at reduced pressure for removal of its dissolved hydrogen sulphide content. Gas from the separator 23, which contains a high proportion of hydrogen and some hydrogen sulphide, is recycled from line 24 via line 26 and line 12 to the reactor 13, if desired some of the gas being recycled via valved line 27 into admixture with the feed to the preheater 11 via line 10, any excess gas being vented from line 24 via line 28. Some of the liquid naphtha from the separator 23 may be returned as reflux to the top of the knock-out tower 15 via line 29. According to a specific example, a 100–200° C. A. S. T. M. catalytically cracked naphtha cut having a sulphur content of 0.313% wt. and a 230–280° C. straight run kerosine having a sulphur content of .4% wt. were blended in equal parts by volume, and treated under the following conditions:

| | |
|---|---|
| Catalyst | Mixed cobalt and molybdenum oxides on alumina. |
| Temperature | 780° F. |
| Pressure | 70 p. s. i. ga. |
| Space velocity | 2 v./v./hr. |
| Gas recycle | 4000 C. F./B. at 100 p. s. i. ga. | and the treated naphtha then distilled from the blend. Inspection data for the original catalytically cracked gasoline and for the distillate were as follows:

| Feedstock | Iranian Cat. Cracked Gasoline, 100–200° C. ASTM Boiling Range | Treated and Rerun Cat. Cracked Gasoline (inhib with 7.5 lb. Dupont 22/1,000 BBl.) |
|---|---|---|
| Distillation: | | |
| I. B. P. °C. | 128 | 116.5 |
| 5% vol. @ °C. | 136.5 | 128 |
| 10% vol. @ °C. | 139.5 | 131.5 |
| 50% vol. @ °C. | 165 | 154 |
| 90% vol. @ °C. | 205.5 | 196.5 |
| F. B. P. °C. | 219 | 225 |
| Specific Gravity 60° F./60° F. | 0.8340 | 0.8165 |
| Bromine Number (F) | 50 | 22 |
| Colour Saybolt | −16 | +20 |
| A. S. T. M. Induction Period, min. | 115 | 480 |
| Gum Existant, mg./100 | 12 | Trace |
| Gum E+P (at 120) mg./100 | 169 | 2 |
| Octane Number (C. F. R. M. M.) | 79.2 | 75.7 |
| Sulphur percent wt. | 0.313 | 0.015 |
| Sulphur Removal percent | | 95.2 |

The catalytically cracked spirit thus treated has low sulphur and gum contents, a high stability and a good colour and is a satisfactory merchantable product.

The straight run fraction from the operation has a sulphur content of .1% wt. and is particularly suitable for inclusion in tractor vapourising oil blends.

If the kerosine of the example just described is replaced by the raffinate obtained by extracting the kerosine with sulphur dioxide, the raffinate having a sulphur content of .03% wt., the other conditions being substantially the same, a naphtha product is obtained having a sulphur content of <.01% wt., while the sulphur content of the recovered raffinate is also <.01% wt.

We claim:

1. A vapor phase process for the hydrocatalytic desulphurisation of a cracked naphtha boiling in the gasoline range, which comprises passing said naphtha to a reaction zone in admixture solely with a petroleum fraction which contains naphthenic constituents capable of providing hydrogen by dehydrogenation and which has a boiling range sufficiently above the cracked naphtha such that the naphtha may be removed by distillation from the treated mixture in the vapor phase, said petroleum fraction selected from the group consisting of kerosene and heavy naphtha having a boiling point above 200° C., wherein the mixture is contacted with hydrogen derived solely from the mixture and with a sulphur-resistant dehydrogenation-hydrogenation catalyst at a temperature of about 750°–800° F. and at a pressure of 50–200 p. s. i. ga., said temperature and pressure correlated with one another, such that an amount of hydrogen is obtained by dehydrogenation of said naphthenic constituents not substantially in excess of that required to convert organically-combined sulphur contained in the cracked naphtha and in the petroleum fraction in admixture therewith into hydrogen sulphide and to maintain the necessary partial pressure of hydrogen in the reaction zone without the need of hydrogen from an extraneous source, removing the naphtha from the treated mixture by distillation and recovering the petroleum fraction, reduced as to sulphur and naphthene content as a product, separating a hydrogen-rich gas mixture and hydrogen sulphide from the treated naphtha, recycling said hydrogen-rich gas mixture to the reaction zone to constitute the whole of the hydrogen supplied to said zone, and recovering a cracked naphtha of reduced sulphur content from the product of said separating operation.

2. The process in accordance with claim 1 wherein the space velocity of the admixture is about 1.0 to 5.0 v./v./hr., and the recycle rate of the hydrogen-rich gas mixture to the reaction zone is of a rate about 2000 to 4000 C. F./B.

3. A process in accordance with claim 1 wherein the petroleum fraction is a heavy naphtha which has been treated for the removal of aromatic compounds therefrom.

4. A process in accordance with claim 1 wherein the petroleum fraction is kerosene.

5. A process according to claim 1 wherein the catalyst employed is of the cobalt molybdate type.

References Cited in the file of this patent

UNITED STATES PATENTS

| | | |
|---|---|---|
| 2,253,308 | Rosen | Apr. 19, 1941 |
| 2,574,451 | Porter et al. | Nov. 6, 1951 |
| 2,591,525 | Engel et al. | Apr. 1, 1952 |
| 2,606,141 | Meyer | Aug. 5, 1952 |